(12) United States Patent
Swieter

(10) Patent No.: US 10,059,371 B2
(45) Date of Patent: Aug. 28, 2018

(54) STEERING SYSTEM FOR AN AUTOMATED DRIVING PROCESS OF A MOTOR VEHICLE

(71) Applicant: VOLKSWAGEN AKTIENGESELLSCHAFT, Wolfsburg (DE)

(72) Inventor: Ingo Swieter, Cremlingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/543,252

(22) PCT Filed: Dec. 22, 2015

(86) PCT No.: PCT/EP2015/080938
§ 371 (c)(1),
(2) Date: Jul. 13, 2017

(87) PCT Pub. No.: WO2016/116242
PCT Pub. Date: Jul. 28, 2016

(65) Prior Publication Data
US 2018/0001926 A1    Jan. 4, 2018

(30) Foreign Application Priority Data

Jan. 22, 2015 (DE) .................. 10 2015 201 032

(51) Int. Cl.
B62D 6/00 (2006.01)
B62D 5/04 (2006.01)
B62D 15/02 (2006.01)

(52) U.S. Cl.
CPC ............ B62D 6/003 (2013.01); B62D 5/046 (2013.01); B62D 15/029 (2013.01); B62D 5/0421 (2013.01)

(58) Field of Classification Search
CPC ...... B62D 6/003; B62D 15/029; B62D 5/046; B62D 5/0421
See application file for complete search history.

(56) References Cited

U.S. PATENT DOCUMENTS

| 4,653,601 A | 3/1987 | Nakamura et al. |
| 6,029,767 A * | 2/2000 | Kifuku ................ B62D 5/0484 180/443 |

(Continued)

FOREIGN PATENT DOCUMENTS

| DE | 10157666 A1 | 6/2003 |
| DE | 60033769 T2 | 12/2007 |

(Continued)

OTHER PUBLICATIONS

Search Report for German Patent Application No. 10 2015 201 0325; dated Sep. 16, 2015.

(Continued)

Primary Examiner — Tuan C To
(74) Attorney, Agent, or Firm — Barnes & Thornburg LLP

(57) ABSTRACT

A steering system for an automated driving process of a motor vehicle having at least one steering controller, a power electronics unit, apparatus for adjusting a steering angle, and an electric motor. The steering system includes a steering controller which generates steering control commands dependent on the data of a surroundings sensor system. The steering control commands are converted into actuation signals for the electric motor by the power electronics unit, and the electric motor then actuates the apparatus for adjusting the steering angle. The steering controller generates a current steering control command and at least one future steering control command dependent on the data of the (Continued)

surroundings sensor system and transmits the steering control commands to the power electronics unit.

10 Claims, 3 Drawing Sheets

(56) References Cited

U.S. PATENT DOCUMENTS

| | | | | |
|---|---|---|---|---|
| 6,152,254 A * | 11/2000 | Phillips | ............... | B62D 5/0463 180/421 |
| 6,213,249 B1 * | 4/2001 | Noro | ................... | B62D 5/0463 180/407 |
| 2005/0092542 A1 * | 5/2005 | Turner | .................. | B62D 1/286 180/446 |
| 2009/0294209 A1 * | 12/2009 | Bluhm | .................. | B60R 25/021 180/446 |
| 2011/0285335 A1 * | 11/2011 | Tada | .................... | H02H 7/0844 318/400.22 |
| 2013/0277138 A1 * | 10/2013 | Arai | ........................ | B62D 5/04 180/443 |
| 2014/0210393 A1 * | 7/2014 | Kanekawa | ............ | B60R 21/017 318/494 |
| 2015/0066306 A1 * | 3/2015 | Kodera | ............... | B62D 5/0466 701/43 |
| 2015/0145448 A1 * | 5/2015 | Mukai | ...................... | H02P 6/12 318/400.21 |
| 2015/0180309 A1 * | 6/2015 | Klemen | ............... | H02K 7/1823 290/50 |
| 2015/0295502 A1 * | 10/2015 | Hirano | ................ | B60L 11/1868 363/17 |
| 2015/0360715 A1 * | 12/2015 | Shimizu | ................ | B62D 5/001 701/43 |
| 2016/0089981 A1 * | 3/2016 | Kodawara | ............... | B60L 1/003 307/10.1 |
| 2016/0142003 A1 * | 5/2016 | Scotson | ............. | H02P 29/0243 180/446 |
| 2016/0231142 A1 * | 8/2016 | Kawano | ............ | G01D 5/24485 |

FOREIGN PATENT DOCUMENTS

| | | | | |
|---|---|---|---|---|
| DE | 102007003783 A1 | 7/2008 | | |
| DE | 602005005631 T2 | 4/2009 | | |
| DE | 102014100631 A1 | 7/2014 | | |
| DE | 102013203978 A1 | 9/2014 | | |
| DE | 102014102767 A1 | 9/2014 | | |
| EP | 1508505 | 2/2005 | | |
| EP | 1574419 A2 | 9/2005 | | |
| EP | 1603096 | 12/2005 | | |
| EP | 1810909 A1 * | 7/2007 | ........... | B62D 5/0463 |
| EP | 1975041 A2 * | 10/2008 | ............. | B60G 7/003 |
| EP | 2216234 A1 * | 8/2010 | ............. | B62D 5/008 |

OTHER PUBLICATIONS

Search Report for International Patent Application No. PCT/EP2015/080938; dated Apr. 28, 2016.

* cited by examiner

STEERING SYSTEM FOR AN AUTOMATED DRIVING PROCESS OF A MOTOR VEHICLE

PRIORITY CLAIM

This patent application is a U.S. National Phase of International Patent Application No. PCT/EP2015/080938, filed 22 Dec. 2015, which claims priority to German Patent Application No. 10 2015 201 032.5, filed 22 Jan. 2015, the disclosures of which are incorporated herein by reference in their entirety.

SUMMARY

Illustrative embodiments relate to a steering system for the automated driving of a motor vehicle.

BRIEF DESCRIPTION OF THE DRAWINGS

The disclosed embodiments are described in detail below with reference to the figures, in which.

DETAILED DESCRIPTION OF THE DISCLOSED EMBODIMENTS

Figure 1:
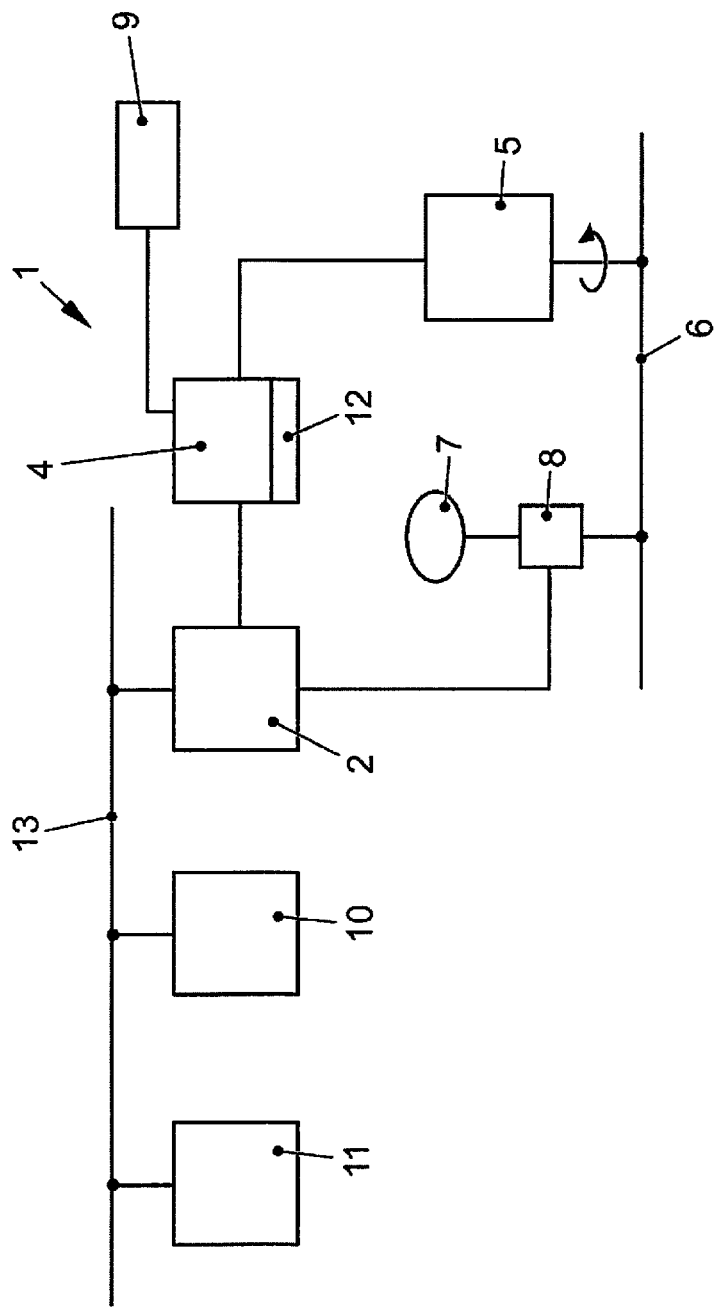
FIG. 1 shows a schematic block diagram of a steering system to represent the communications connections.

One such steering system is known, for example, from EP 1 508 505 B1. The basic design of most steering systems for automated driving consists of a steering control unit, power electronics, means for adjusting a steering angle on the wheels and an electric motor. The steering control unit generates steering control commands for this depending on data of a surroundings sensor arrangement, which are converted by the power electronics into actuation signals for the electric motor, which then actuates the means for adjusting a steering angle. The surroundings sensor arrangement can, for example, be at least one camera or else a position detection device of the motor vehicle, wherein the position data are matched to a digital road map. In contrast to the hitherto known driver assistance systems, the driver is enabled to remove his hands from the steering wheel during automated driving.

An electrical steering system is known from U.S. Pat. No. 4,653,601 A, wherein a combustion engine drives a generator for a motor vehicle on-board electrical system in a generator mode. At the same time, the combustion engine drives a d.c. generator that energizes a d.c. motor to adjust a steering angle. During this the d.c. generator is controlled by a control unit depending on the speed and a detected torque caused by a manual torque on a steering axle.

A steering system for automated driving must comprise a considerable fault tolerance, wherein however the entire steering system cannot be made redundant.

Disclosed embodiments provide a steering system for the automated driving of a motor vehicle that comprises improved reliability with low component redundancy.

The steering system for the automated driving of a motor vehicle comprises at least one steering control unit, power electronics, means for adjusting a steering angle and an electric motor. The means for adjusting a steering angle are, for example, implemented as a toothed rack, wherein the electric motor is connected to the toothed rack using a gearbox, for example. The electric motor is, for example, implemented as a permanently energized synchronous motor. The steering system is designed such that the steering control unit generates steering control commands depending on the data of a surroundings sensor arrangement. In this case, the surroundings sensor arrangement can be implemented as at least one camera and/or position determination device with a digital road map. In addition, the surroundings sensor arrangement can comprise infrared, radar, laser and/or ultrasonic sensors. The steering control commands are converted by the power electronics into actuation signals for the electric motor, which then actuates the means for adjusting a steering angle. The steering control unit generates a current steering control command for a point in time t0 depending on the data of the surroundings sensor arrangement and at least one future steering control command for a point in time t1, which are transmitted to the power electronics, wherein t1>t0. The power electronics comprise a memory in which the at least one future steering control command is stored. The power electronics are designed such that in the event of a communications disruption between the steering control unit and the power electronics, the at least one future steering control command is read from the memory and converted into actuation signals for the electric motor. In this case, the origin of the communications disruption can also be caused by a disruption in the connection of the surroundings sensor arrangement to the steering control unit. This ensures that the steering system does not fail suddenly in the event of a communications disruption, but still operates for a certain period, so that the driver and/or the vehicle system have time for countermeasures.

In at least one disclosed embodiment, the steering system comprises a warning device that is implemented such that a request to take over the steering by the driver is generated in the event of a communications disruption. The request for this can be carried out audibly and/or visually and/or haptically.

In a further disclosed embodiment, a takeover time interval is defined, within which a driver must take over the steering, wherein the number of future steering control commands is selected such that the number covers a time range greater than or equal to the takeover time interval. This guarantees that the steering system operates in a stable manner until the requested takeover.

In a further disclosed embodiment, a time stamp as to when a command is to be carried out is associated with at least one future steering control command. This enables the number of future steering control commands to be stored to be reduced, in particular, if a steering control command remains unchanged over several cycles.

In a further disclosed embodiment, the steering control unit is implemented such that in the event of a transmission of current and future steering control commands in a cycle, the commands are compared with the steering control commands in the preceding cycle, wherein only in the event of deviations from the already transmitted steering control commands is the current and/or future steering control command transmitted to the power electronics. This saves bandwidth in the transmission.

In an alternative solution, the steering system comprises a coupling element, by means of which the steering system is electrically connected to an on-board power system. In this case, the coupling element is implemented such that the coupling element electrically decouples the steering system from the on-board power system in the event of a defect of the on-board power system, wherein the steering system is implemented with at least one dedicated voltage supply. This ensures that in the event of a voltage failure of the on-board power system, for example, because of a short-circuit, the steering system continues to be supplied with voltage. The coupling element is, for example, implemented as a DC/DC converter or as a power switch. The dedicated voltage supply of the steering system can in principle be a battery or a capacitor for this.

In at least one disclosed embodiment, the voltage supply is implemented as a generator, which may be connected to a drive axle via a coupling. This ensures that, as long as the vehicle is rolling, the generator is producing voltage.

In a further disclosed embodiment, the coupling is implemented such that the coupling is engaged depending on a detected defect in the on-board power system. As a result of this, the generator only loads the drive in the case of a defect of the on-board power system.

It can further be provided that the surroundings sensor arrangement is associated with the steering system for voltage supply purposes, so that in the event of a defect of the on-board power system, the surroundings sensor arrangement still continues to work and can provide the steering control unit with data.

The measures may be combined, i.e., the steering system is connected to the on-board power system via a coupling element and comprises at least one voltage supply, and in addition the power electronics store at least one future steering control command.

Regarding a disclosed procedural embodiment, reference is made in full to the preceding embodiments.

In FIG. 1, a schematic block diagram of a steering system 1 for automated driving is represented. The steering system 1 comprises a steering control unit 2, power electronics 4, an electric motor 5 and a toothed rack 6. The steering system 1 further comprises a manual steering control 7, a torque sensor 8 and a warning device 9. A surroundings sensor arrangement 10 and a further control unit 11 are also represented in FIG. 1. In this case, the surroundings sensor arrangement 10 can be a component of the steering system 1, but does not have to be. The power electronics 4 is implemented with a memory 12 here.

The steering control unit 2, the surroundings sensor arrangement 10 and the further control unit 11 are connected to each other for data communications purposes by means of a bus system 13.

During normal operation, the driver applies a manual torque by means of the manual steering control 7 that is transferred to the toothed rack 6. The torque sensor 8 detects the manual torque and transmits the torque to the steering control unit 2. In the steering control unit 2, a boosting torque is calculated taking into account a vehicle speed, and a corresponding signal is transmitted to the power electronics 4. The power electronics 4 then generates actuation currents for the electric motor 5, which then applies the boosting torque to the toothed rack 6. The steering control unit obtains the vehicle speed via the further control unit 11, for example.

During automated driving on the other hand, the driver no longer has to have his hands on the manual steering control 7. Rather, steering control commands are generated in the steering control unit 2 using the data of the surroundings sensor arrangement 10, optionally taking into account the vehicle speed, which are then implemented. In this case, for example, preprocessing of the data of the surroundings sensor arrangement 10 can be carried out in the further control unit 11, but this is not imperative.

Using the data of the surroundings sensor arrangement 10, both a current steering control command and also future steering control commands for subsequent points in time can be determined. The current steering control command and also the future steering control commands are then transmitted to the power electronics 4 as a message. There the current steering control command is converted into actuation currents for the electric motor 5, whereas the future steering control commands are stored in the memory 12. If there is then a communications disruption between the steering control unit 2 and the power electronics 4, so that the electronics no longer receive new steering control commands from the steering control unit 2, then the power electronics 4 access the stored future steering control commands in the memory 12 and convert the commands one after the other into actuation currents (actuation signals) for the electric motor 5.

Figure 2:
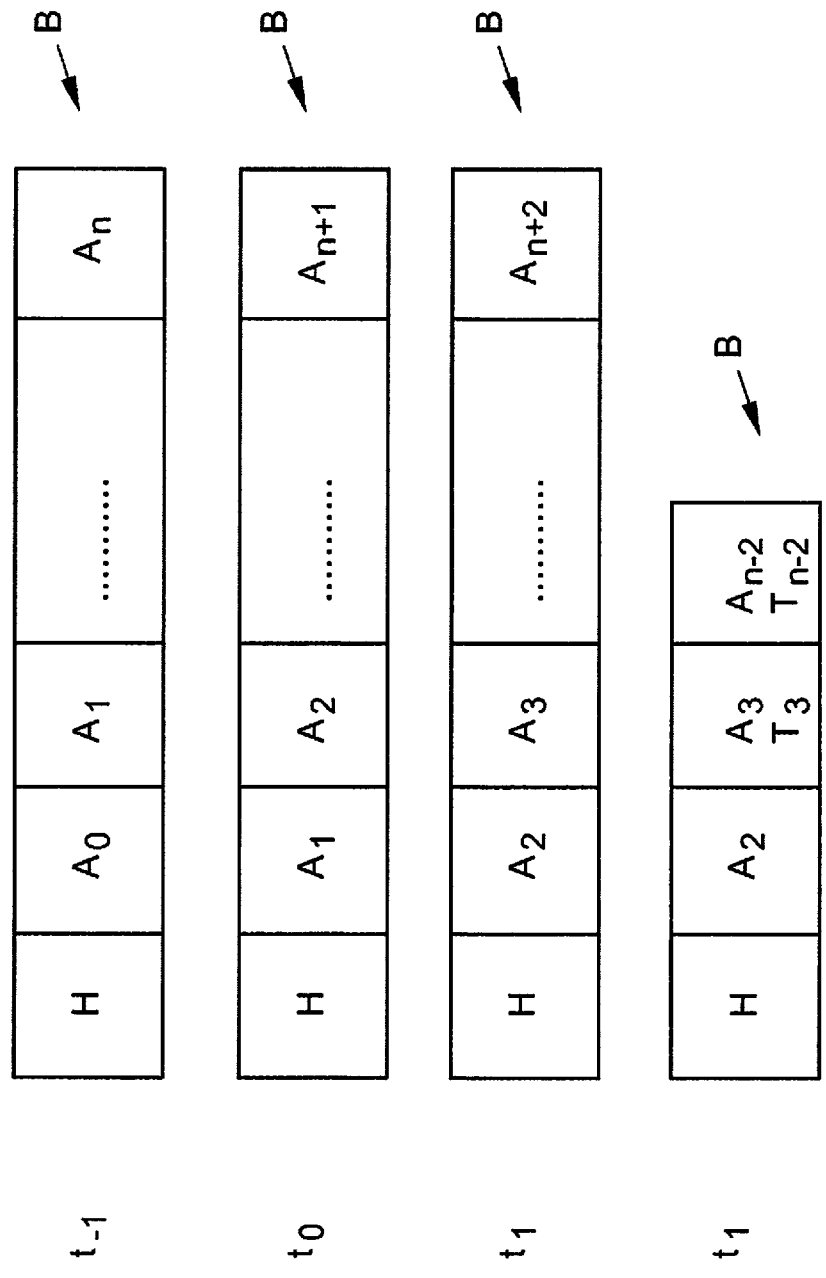
FIG. 2 shows schematic representations of messages between a steering control unit and power electronics.

In FIG. 2 the structure of such a message B is represented schematically. At a point in time t1, the steering control unit 2 produces a current steering control command A0, which is to be converted at the point in time t0 by the power electronics 4 immediately after reception. Further, the steering control unit 2 produces future steering control commands A1-An. The estimation of the future steering control commands A1-An can, for example, be carried out from preliminary information about the course of the road and/or camera images that record the course of the road ahead. The steering control commands A0-An are transmitted together as a message B with a header H to the power electronics 4. There the steering control command A0 is immediately converted into actuation signals or currents for the electric motor 5, wherein the future steering control commands A1-An are stored in the memory 12. At a clock time or cycle time later, using the data of the surroundings sensor arrangement 10, the steering control unit 2 produces a further message B at the point in time t0. Accordingly, the index of the steering control commands A1-An+1 increments, wherein A1 is now the current steering control command. Here it is noted that A1 at the point in time t0 does not have to be identical with A1 at the point in time t1, because a modification of the steering control commands may have become necessary as a result of the current surroundings sensor system data. This can now also be exploited to reduce the amount of data to be transmitted by, for example, only transmitting the steering control commands A1-An+1 at the point in time t0 that have changed compared to those at the point in time t1. Accordingly, the message B is then also constructed at the point in time t1.

To further reduce the amount of data to be transmitted, it can also be provided that a separate steering control command is not transmitted for every cycle if a future steering control command extends over several cycles. In this case, a time stamp which, for example, expresses when the steering control command is to be carried out, is applied to the steering control command. This is represented in the lowest message B, for example. In this case, in addition to the header H and the current steering control command A2, a future steering control command A3 with a time stamp T3 and a further future steering control command An-2 with a time stamp Tn-2 are transmitted. The power electronics 4 would then first implement A2 and then at the point in time T3 would implement the steering control command A3 until the point in time Tn-2 is reached. It can readily be seen that this enables the amount of data transmitted to be reduced considerably.

Figure 3:
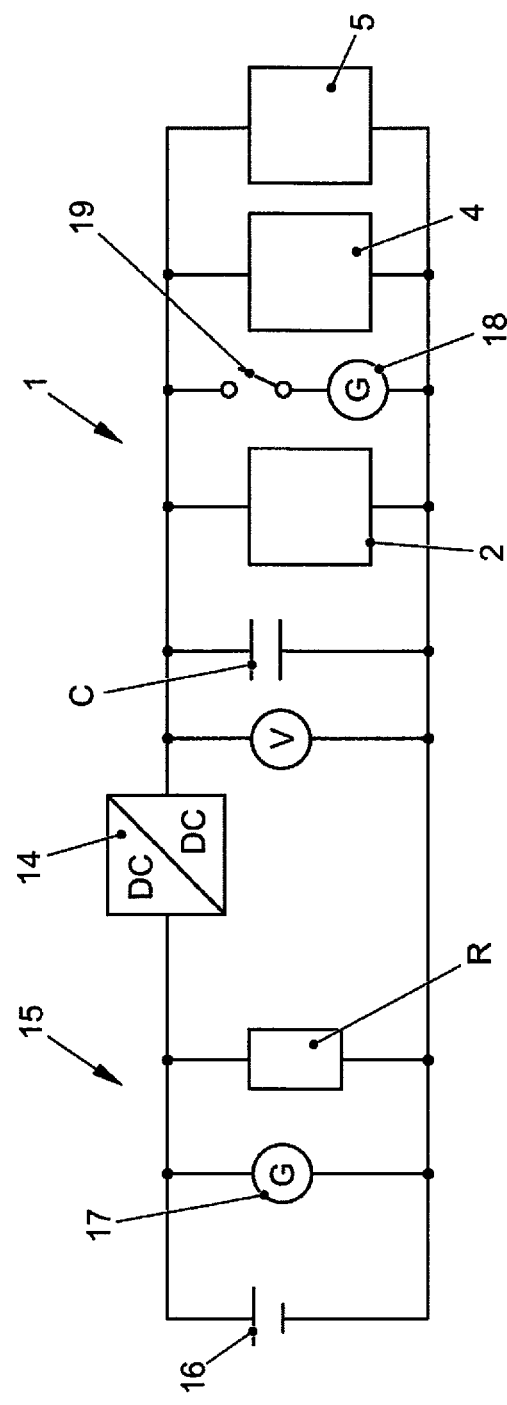
FIG. 3 shows a schematic block diagram of a steering system to represent the voltage supply.

In FIG. 3, a block diagram of the steering system 1 is represented, wherein for reasons of clarity the communications paths are not represented, because this primarily concerns the representation of the voltage supply. The steering system 1 again comprises the steering control unit 2, the power electronics 4 and the electric motor 5. The steering system 1 is electrically connected to an on-board power system 15 via a coupling element 14 implemented as a DC/DC converter. The on-board power system 15 comprises a battery 16, a generator 17 and an electrical load R. The steering system 1 further comprises a voltage measuring device V, a smoothing capacitor C and a further generator 18 with a coupling 19, wherein for simplicity the coupling 19 is represented as a switch. Finally, the steering system 1 can also comprise the surroundings sensor arrangement 10 and the warning device 9 according to FIG. 1. The generator 18 is connected via the coupling 19 to a drive axle (that is not represented) of the motor vehicle.

In normal operation, the steering system 1 is supplied with voltage from the on-board power system 15 by means of the DC/DC converter and the coupling 19 is open. If the voltage in the on-board power system 15 then fails, then the voltage at the output of the DC/DC converter also fails. The voltage measuring device V detects this and generates a switch signal for the coupling 19 and thus connects the generator 18 to the drive axle. The travelling vehicle then drives the generator 18, which then provides the supply voltage for the steering system 1. For this purpose, the generator 18 is, for example, implemented with an inverter that is not represented. The steering system 1 is then decoupled from the on-board power system 15 by the DC/DC converter and the steering system 1 can continue to operate despite the failure of the on-board power system 15.

What is claimed is:

1. A steering system for the automated driving of a transportation vehicle, the steering system comprising:
   at least one steering control unit;
   power electronics;
   a steering angle adjustment configuration including a toothed rack; and
   an electric motor,
   wherein the steering system is implemented such that the steering control unit generates steering control commands depending on the data provided by a surroundings sensor arrangement,
   wherein the steering control commands are converted by the power electronics into actuation signals for the electric motor,
   wherein, based on the actuation signals, the electric motor actuates the steering angle adjustment configuration,
   wherein the at least one steering control unit is implemented such that, depending on the data provided by the surroundings sensor arrangement, the at least one steering control unit generates a current steering control command for a point in time $t_0$ and at least one future steering control command for a point in time $t_1$ and transmits the steering control commands to the power electronics, wherein $t_1 > t_0$,
   wherein the power electronics comprise a memory, in which the at least one future steering control command is stored,
   wherein the power electronics are implemented such that, in response to a communications disruption between the at least one steering control unit and the power electronics, the stored at least one future steering control command is converted into actuation signals for the electric motor.

2. The steering system of claim 1, further comprising a warning device implemented such that, in response to a communications disruption, a request is generated to take over the steering by the driver.

3. The steering system of claim 2, wherein a takeover time interval is defined, within which a driver must take over steering of the transportation vehicle, wherein the number of future steering control commands is selected to cover a time range greater than or equal to the takeover time interval.

4. The steering system of claim 1, wherein a time stamp indicating when a command is to be carried out is assigned to at least one future steering control command.

5. The steering system of claim 1, wherein the steering control unit is implemented such that, in response to a transmission of current and future steering control commands in a cycle, the commands are compared with the steering control commands in the preceding cycle, wherein the current and/or future steering control command are only transmitted to the power electronics in response to there being deviations from the already transmitted steering control commands.

6. The steering system of claim 1,
   wherein the steering system comprises a coupling element and a dedicated voltage supply,
   wherein the steering system is electrically connected to an on-board power system via the coupling element,
   wherein the coupling element is implemented such that, in response to detection of a defect of the on-board power system, the coupling element electrically decouples the steering system from the on-board power system, and
   wherein the steering system has a dedicated voltage supply.

7. A steering system for the automated driving of a transportation vehicle, the steering system comprising:
   at least one steering control unit;
   power electronics; and
   an electric motor,
   wherein the steering system is implemented such that, depending on the data provided by a surroundings sensor arrangement, the steering control unit generates steering control commands that are converted by the power electronics into actuation signals for the electric motor,
   wherein the steering system is electrically connected to an on-board power system via a coupling element,
   wherein the coupling element is implemented such that, in response to detection of a defect of the on-board power system, the coupling element electrically decouples the steering system from the on-board power system,
   wherein the steering system has a dedicated voltage supply.

8. The steering system of claim 7, wherein the voltage supply is a generator.

9. The steering system of claim 8, wherein the generator is connected to a drive axle via a coupling.

10. The steering system of claim 9, wherein the coupling is closed depending on a detected defect in the on-board power system.

* * * * *